(12) United States Patent
Roberts et al.

(10) Patent No.: US 12,523,266 B2
(45) Date of Patent: Jan. 13, 2026

(54) AIR DISC BRAKE FOR A ROAD VEHICLE

(71) Applicant: MEI Brakes Limited, Sheffield (GB)

(72) Inventors: Paul Roberts, Monmouth (GB); Jonathan Jackson, Ross-on-Wye (GB); Adrian Kinder, Newport (GB)

(73) Assignee: MEI Brakes Limited, Sheffield (GB)

( * ) Notice: Subject to any disclaimer, the term of this patent is extended or adjusted under 35 U.S.C. 154(b) by 503 days.

(21) Appl. No.: 17/836,973

(22) Filed: Jun. 9, 2022

(65) Prior Publication Data

US 2022/0397166 A1     Dec. 15, 2022

(30) Foreign Application Priority Data

Jun. 10, 2021 (GB) .................................... 2108266

(51) Int. Cl.
*F16D 55/227* (2006.01)
*B60T 1/06* (2006.01)
(Continued)

(52) U.S. Cl.
CPC ............ *F16D 55/227* (2013.01); *B60T 1/065* (2013.01); *B60T 13/36* (2013.01); *F16D 65/18* (2013.01);
(Continued)

(58) Field of Classification Search
CPC ........ B60T 13/36; B60T 1/065; F16D 55/226; F16D 55/227; F16D 65/18;
(Continued)

(56) References Cited

U.S. PATENT DOCUMENTS 4,428,463 A * 1/1984 Burgdorf ............ F16D 65/0976
188/73.38
4,632,227 A * 12/1986 Mery .................... F16D 65/092
188/73.1
(Continued)

FOREIGN PATENT DOCUMENTS

DE     102015109541 A1     12/2016
DE     102016117777 A1      3/2018
(Continued)

OTHER PUBLICATIONS

English machined translation of DE-102018003102-A1, Oct. 17, 2019.*
Search Report issued for GB2018266.4 on Nov. 4, 2021, 4 pages.

*Primary Examiner* — Robert A. Siconolfi
*Assistant Examiner* — San M Aung
(74) *Attorney, Agent, or Firm* — Hard IP Professional Services LLC (57) ABSTRACT

An air disc brake for a road vehicle is proposed, having a mechanism for causing retraction of the brake pads when the brakes are no longer applied, to avoid parasitic drag caused by continued contact of the brake pads against the brake disc. The proposed mechanism includes a pin located in a fixed position relative to one brake pad, and extending through an aperture in the other brake pad. A coil spring is supported on the pin, and pushes the brake pads apart. Where the pin extends through the aperture the extent of the pin provides an indication of the wear state of the pads and disc, which is visible through apertures in the wheel rim.

19 Claims, 4 Drawing Sheets

(51) Int. Cl.
*B60T 13/36* (2006.01)
*F16D 65/18* (2006.01)
*F16D 66/02* (2006.01)
*F16D 121/04* (2012.01)
*F16D 125/58* (2012.01)
*F16D 127/02* (2012.01)

(52) U.S. Cl.
CPC .......... *F16D 66/02* (2013.01); *F16D 2121/04* (2013.01); *F16D 2125/585* (2013.01); *F16D 2127/02* (2013.01); *F16D 2200/0021* (2013.01); *F16D 2250/0023* (2013.01); *F16D 2250/0084* (2013.01)

(58) Field of Classification Search
CPC ................ F16D 65/0973; F16D 66/02; F16D 2055/0029; F16D 2055/007; F16D 2065/1396; F16D 2121/04; F16D 2125/585; F16D 2127/02; F16D 2200/0021; F16D 2250/0023; F16D 2250/0084
USPC ....................................................... 188/73.45
See application file for complete search history.

(56) References Cited

U.S. PATENT DOCUMENTS

| | | | |
|---|---|---|---|
| 5,513,726 A * | 5/1996 | Thompson | F16D 66/021 340/454 |
| 10,030,723 B1 | 7/2018 | Liao | |
| 2003/0178261 A1* | 9/2003 | Ciotti | F16D 55/228 188/73.31 |
| 2011/0127122 A1* | 6/2011 | Suh | F16D 65/0977 188/72.4 |
| 2012/0043168 A1 | 2/2012 | Narayanan et al. | |
| 2015/0001010 A1 | 1/2015 | Liao | |
| 2017/0023082 A1* | 1/2017 | Morris | F16D 65/0068 |
| 2017/0198772 A1* | 7/2017 | Rocca-Serra | F16D 65/092 |
| 2018/0106313 A1* | 4/2018 | Fricke | F16D 55/226 |
| 2018/0106317 A1* | 4/2018 | Fricke | F16D 55/226 |
| 2019/0056000 A1* | 2/2019 | Beyer | F16D 65/0973 |
| 2019/0249735 A1 | 8/2019 | David et al. | |
| 2021/0062876 A1 | 3/2021 | Beyer et al. | |

FOREIGN PATENT DOCUMENTS

| | | | | |
|---|---|---|---|---|
| DE | 102016120481 A1 | | 5/2018 | |
| DE | 102016124310 A1 | | 6/2018 | |
| DE | 102017009295 A1 | | 4/2019 | |
| DE | 102018003102 A1 | * | 10/2019 | ............ F16D 65/02 |
| DE | 102018114396 A1 | | 12/2019 | |
| DE | 102018120512 A1 | | 2/2020 | |
| GB | 2036898 A | | 7/1980 | |

* cited by examiner

AIR DISC BRAKE FOR A ROAD VEHICLE

CROSS REFERENCE TO RELATED APPLICATION

This application claims priority to Great Britain patent application no. GB2108266.4, filed Jun. 10, 2021, the contents of which are incorporated herein by reference in their entirety.

TECHNICAL FIELD

The present invention relates to an air disc brake for a road vehicle, in particular for a large road vehicle such as a truck, trailer or bus.

BACKGROUND TO THE INVENTION

Air disc brakes are the preferred type of brake for most heavy road vehicles such as trucks, trailers and buses. In particular, in a sliding caliper brake, a brake carrier is rigidly fixed to the vehicle, and a brake caliper slides with respect to the carrier, mounted on guide pins. When the brake is operated, tappet(s) in the caliper push one brake pad directly towards the brake disc. When the pad contacts the disc, further operation causes the caliper to slide on the carrier, bringing the pad on the other side into contact with the brake disc as well. A clamping force is then applied by the pads on either side to the brake disc, to slow or stop the vehicle.

When the brake is no longer being operated (i.e. when compressed air is no longer being supplied), a return spring in the caliper will return the tappet(s), i.e. retract the tappet(s) back into the caliper. However, typically the tappet(s) are not fixed to the caliper-side pad and so can only "push" the pad towards the disc, not "pull" the pad back again.

In known air disc brakes, the pads are therefore not forced away from the disc when brake application is finished. There will no longer be any clamping force, and the pads in practice will normally slide away from the discs, at least after a short time, due to vibrations in the vehicle. However, if the pads remain even partially in contact with the disc then this will create parasitic drag which can result in reduced fuel efficiency. It can also cause the pads to wear, and shorten the service lifetime of the pads.

Pad retraction systems have been proposed, for example using springs to provide a return force and move the pads away from the brake disc when the brakes are no longer being applied. However, brake pads are typically arranged to abut against a surface of the brake carrier along a bottom edge of the brake pad, whereas known pad retraction systems generally apply retraction load near the top of the brake pad. This can mean that the retraction load causes the pad to tip rather than be pushed back parallel to the disc, and potentially the bottom edge of the pad may remain in contact with the disc, generating parasitic drag and uneven pad wear between the top and bottom edges.

Brake pads are manufactured with enough friction material to allow for wear throughout an acceptable service lifetime of the pad, without any reduction in effectiveness. As the brake pad is used, the friction material on the brake pad will reduce in thickness. To compensate for this, brake calipers are fitted with automatic adjusters which extend the tappets out of the caliper in the brakes-off condition. This moves the resting position of the back of the brake pad closer to the disc, so that the front of the brake pad, i.e. the side which faces the disc and contacts the disc in use, remains at a constant distance from the disc as the pad wears and becomes thinner.

The pads will eventually need to be replaced, and this must happen before they become thin enough to reduce the effectiveness of the brakes and safety of the vehicle. Therefore, the wear state of the pads needs to be checked regularly. This can be done indirectly, by observing the relative position of the caliper and carrier. It is known to provide markings on the caliper and/or carrier to facilitate this, and although it is possible to check the wear state of the pads in this way without removing the wheel, it is still not easy to do and typically requires crawling underneath the vehicle. The likely result is that pad wear state may not be checked as often as it ideally ought to be.

It is an object of the present invention to reduce or substantially obviate these problems.

STATEMENT OF INVENTION

According to the present invention, there is provided a sliding caliper air disc brake, comprising:
  a brake disc;
  a brake carrier;
  a brake caliper slidably mounted on the brake carrier;
  a first brake pad assembly slidably mounted to the brake carrier on an inboard side of the brake disc, and a second brake pad assembly slidably mounted to the brake carrier on an outboard side of the brake disc, each brake pad assembly including a support plate and a friction material fixed to the support plate;
  at least one pin, the pin being fixed to one of the first and second brake pad assemblies, and extending towards and through an aperture in the other brake pad assembly, and a spring supported on the pin for urging the first brake pad assembly away from the second brake pad assembly.

In use, the spring pushes the first and second brake pad assemblies away from each other. This means that when the brakes are not being applied, the pads will not be in contact with the disc and therefore there will be no parasitic drag. It also means that the pads will not wear out too quickly.

The caliper includes an operating mechanism which, when the brakes are applied, pushes at least one tappet out of the caliper to force one of the brake pads against the brake disc.

The spring may be a coil spring, the coil of the spring surrounding the pin when assembled.

Preferably, two pins are provided, one pin being fixed to a respective brake pad assembly at a leading side of the brake pad assembly and one pin being fixed to a respective brake pad assembly at the trailing side of the brake pad assembly. This helps to ensure that the brake pad assemblies are pushed away from each other parallel to the disc, without any tilting of the pad which could cause tangential taper pad wear.

Preferably, at least one of the pins is fixed to the first (inboard) brake pad assembly, and extends through an aperture in the second (outboard) brake pad assembly. In this way, the second brake pad assembly slides relative to the pin as the brake is applied and as the pads are pushed apart when clamping force is removed after application. Moreover, as the friction material on the pads wears down, an adjuster in the brake caliper will cause the tappet(s) extending out of the brake caliper to lengthen, and this reduces the minimum distance between the support plates of the brake pads, in the brakes-off condition. Therefore, as the pads wear, the pin will protrude to a greater extent through the aperture in the second brake pad assembly. By fixing the pin to the pad on the inboard side, the protrusion of the pin through the pad on the outboard side can be seen through holes in a wheel rim. This allows the wear state of the brake pads to be checked very easily, in particular without crawling underneath the vehicle.

Preferably, each of two pins are fixed to the first brake pad assembly, and each extends through a respective aperture in the second brake pad assembly. Therefore, the extent of protrusion of either pin through its aperture can be viewed to determine the wear state of the brake pads. Where the pins are viewed through holes in a wheel rim, being able to view either of two pins makes it all the more likely that at least one of them can easily be seen, bearing in mind that ease of visibility may depend on the approximate alignment of the holes in the wheel rim with the location of the pins.

Preferably markings are provided on the pin to indicate various wear states. In particular, a marking may be provided on the pin on a part of the pin which, when it protrudes through the aperture in the brake pad assembly, indicates that the brake pads should be changed. The marking is preferably in the form of a groove in the pin, which will remain visible even if the pin becomes dirty in use.

Preferably, a location clip is provided. The location clip includes an apertured portion which surrounds the pin, between the two brake pad assemblies. For example, the apertured portion may surround the pin centrally between the two brake pad assemblies. The location clip is substantially rigidly fixed to the brake carrier. The pin may slide through the apertured portion of the location clip.

Where a location clip is provided, two coil springs may be provided on the or each pin. Each of the coil springs acts at one end against the apertured portion of the location clip, and at the other end against a respective one of the brake pad assemblies. In this way, the first brake pad assembly is pushed away from the disc by a force from one spring, acting against the clip which is fixed relative to the brake carrier, and the second brake pad assembly is pushed away from the disc by a force from the other spring, also acting against the clip fixed relative to the brake carrier. Without the location clip, the pads are pushed away from each other but, with respect to the fixed brake carrier, the two pads may not be pushed away from the disc equally. Providing the location clip therefore ensures an equal gap between the disc and the pad on each side of the disc, and ensures that there is no parasitic drag on either side.

The location clip may be formed from stiff wire, the apertured portion being provided as a coil. Preferably, the location clip is fixed to the carrier in two positions, one on either side of the brake disc. The location clip may be fixed to the carrier by a press fit into apertures in the carrier. The location clip in this form may be a very simple, lightweight and inexpensive component which can still easily transfer the necessary forces. The location clip may alternatively be a simple pressed sheet steel part.

Figure 4:
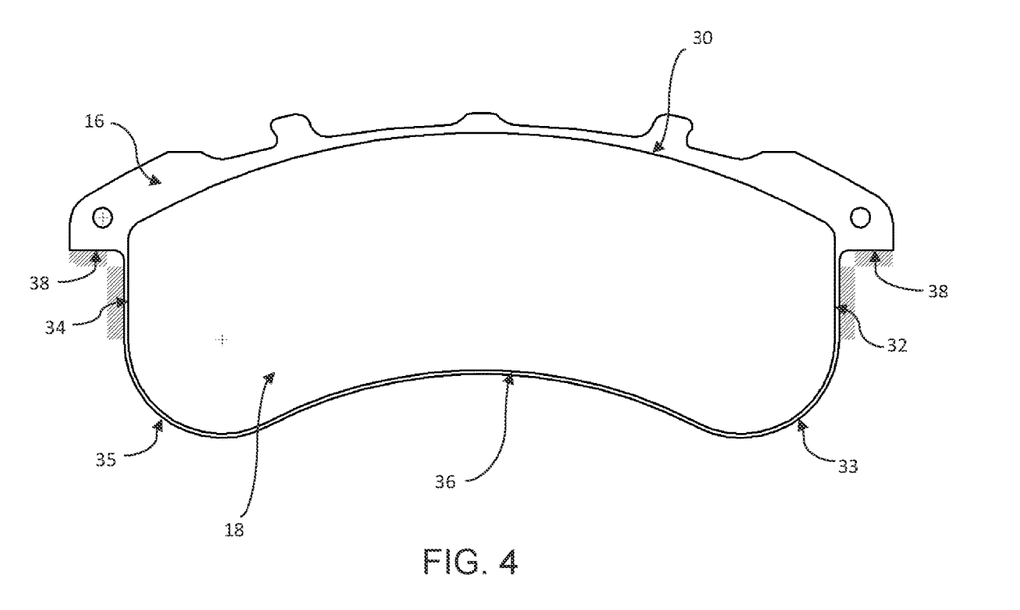
FIG. 4 is a view from in front of a brake pad which forms part of the disc brake of the invention.

Each of the brake pads has abutment surfaces, where the brake pad contacts the brake carrier. The abutment surfaces are edges of the brake pad support plate, and the abutment surfaces are perpendicular the face of the brake pad which contacts the brake disc when the brakes are applied. Abutment surfaces may also be perpendicular to each other. In particular, on each of the leading and trailing sides of the brake pad, there may be two substantially perpendicular abutment surfaces. The two substantially perpendicular abutment surfaces are referred to as a "horizontal abutment surface" and a "vertical abutment surface", with reference to the orientation of the pads as shown in FIG. 4. However the caliper may in fact be mounted to the wheel at an angle, for example an angle of about 45 degrees, and therefore the "horizontal" surface may not be parallel to the road when the caliper is fitted to a vehicle in use.

Preferably, a horizontal abutment surface is provided as a shoulder on the brake pad assembly, so that the horizontal abutment surface is above the vertical abutment surface. This is in contrast to prior art brake pads, in which the horizontal abutment surface is typically a bottom edge of the brake pad (i.e. below the vertical abutment surface).

The fixing of the pin to the brake pad, or the aperture through which the pin passes, may be located just above the shoulder of the pad, i.e. just above the roughly horizontal abutment surface. There may be for example no more than 15 mm, no more than 20 mm, no more than 25 mm or no more than 30 mm between the horizontal abutment surface and the pin. By reducing the distance between the pin, which is the position at which the retraction force acts, and the horizontal abutment surface, the pad is less likely to pivot on the horizontal abutment surface and therefore correct retraction of the pad, parallel to the disc, is assured.

Lower corners of the brake pad may be in the form of smooth curves, for example having a radius of curvature of no less than 20 mm. By providing the horizontal abutment surfaces as a shoulder, the need for sharp corners or tight radiuses in the lower corners of the brake pad is avoided. This improves the stress distribution in the brake pads when the brakes are applied.

BRIEF DESCRIPTION OF THE DRAWINGS

For a better understanding of the present invention, and to show more clearly how it may be carried into effect, reference will now be made by way of example only to the accompanying drawings, in which.

DESCRIPTION OF PREFERRED EMBODIMENTS

Figure 1:
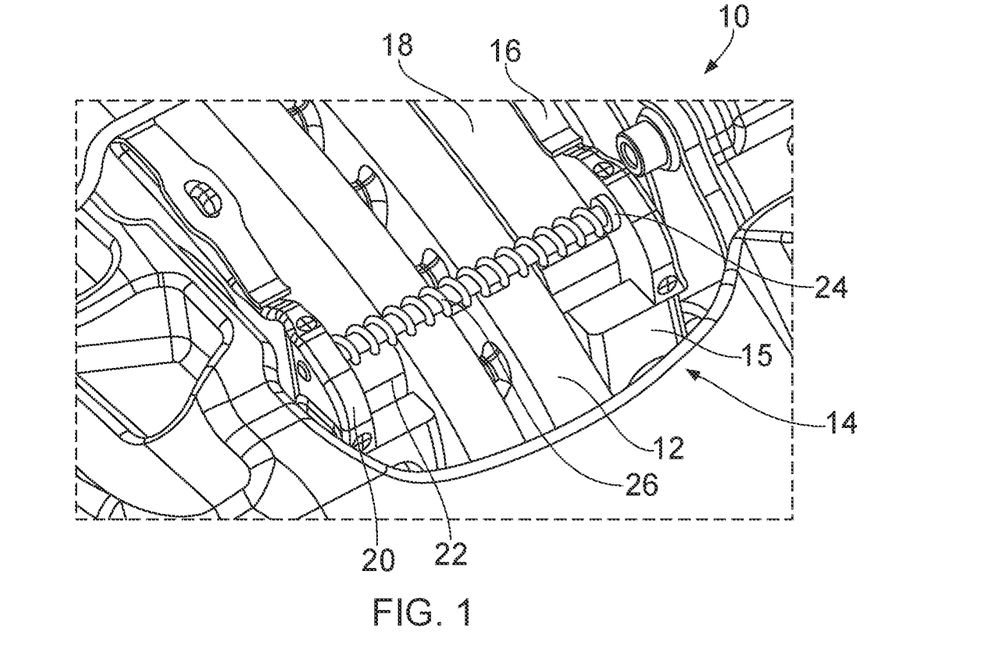
FIG. 1 is a perspective view of part of a disc brake, showing a pad retraction mechanism and wear indicator according to the invention.

Referring firstly to FIG. 1, part of an air disc brake 10 is shown. A brake disc 12 is fixed to a vehicle wheel, and a brake caliper 14 is positioned over the top of the brake disc and on either side of the brake disc 12. The brake caliper 14 is slidably mounted to a brake carrier 15, which in turn is fixed relative to the chassis of the vehicle. The brake caliper 14, on the inboard side, which is the side towards the right in FIG. 1, houses an operating mechanism which causes one or more tappets to extend out of the caliper, towards the brake disc 12, on operation of the brake. The operating mechanism also includes an automatic adjuster which causes the brakes-off, resting position of the tappet(s) to be extended out of the caliper to take up wear.

A brake pad is provided on the inboard side, the brake pad including a support plate 16 and a friction material 18 bonded to the support plate. The brake pad is slidable with respect to the brake carrier 15. When the brakes are applied and the tappet(s) extend out of the caliper, the tappet(s) push the inboard brake pad 16, 18 towards the brake disc 12.

A second brake pad is provided on the outboard side. The outboard brake pad is identical to the inboard brake pad, and includes a support plate 20 and a friction material 22 bonded to the support plate. When the brakes are applied and the tappet(s) extend, after the first brake pad friction material 18 contacts the disc 12, the caliper 14 will slide. The caliper 14 will then push the back of the support plate 20 of the second brake pad, pushing the second brake pad 20, 22 against the brake disc 12. Hence on operation of the brake, the disc 12 is clamped between the first and second brake pads, retarding the vehicle.

On each brake pad, part of the support plate 16, 20 has no friction material bonded to the front of it. Therefore part of the support plate 16 of one brake pad directly faces a corresponding part of the support plate 20 of the other brake pad.

A pin 24 is fixed to this part of the support plate 16. There is an aperture in the support plate 16 and in some embodiments the pin may be a press-fit in the aperture. However, any suitable means of fixing the pin 24 to the support plate 16 may be employed. In some embodiments, a flange 25 may be provided on the pin and the spring load keeps the pin in contact with the support plate. Therefore no press-fit is needed and the pin can easily be disassembled from the support plate when servicing, but remains fixed in operation.

The pin extends in front of the support plate 16, and towards the support plate 20 of the other (outboard) brake pad. An aperture is provided in support plate 20, and the pin can slide through the aperture in support plate 20. Hence the pin stays in a fixed location relative to one pad, but can slide through the aperture in the other pad, and so the pads can still slide towards and away from each other.

Figure 3:
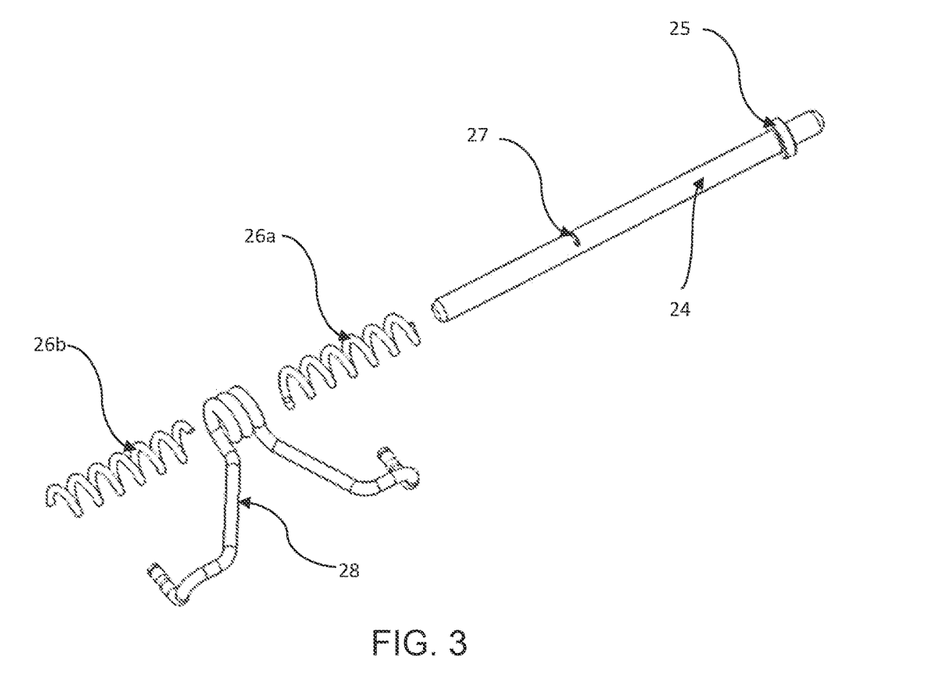
FIG. 3 is an exploded perspective view, showing a pin, a clip and two springs which are components of the second embodiment of the pad retraction mechanism and wear indicator.

In one embodiment, the facing apertures in the two support plates may be identical apertures, but the pin 24 is thicker at one end so that it is a rigid, secure, press fit into one of the apertures, but free to slide through the other. In other embodiments, the apertures may be different sizes. Where the pin has a flange 25, as shown in FIG. 3, no press-fit is required.

A coil spring 26 is supported on the pin 24. The internal diameter through the coil spring 26 is preferably slightly larger than the external diameter of the pin 24, including when the spring is fully extended and including when it is compressed to the fullest extent that it will be in use. The pin 24 therefore acts as a support to keep the spring in position, but does not act with any substantial force on the spring 26 either to urge or to resist extension or compression. Rather, the spring 26 acts on opposing front faces of the support plates 16, 20, to urge the brake pads away from each other. The spring 26 is easily overcome by the forces applied to the brake pads during brake application, but after the brakes are taken off, the spring 26 pushes the pads apart so that they no longer contact the brake disc 12.

FIG. 1 shows a leading side of the disc brake 10. Preferably a similar spring arrangement is provided on the trailing side. This results in an even force being applied to the pads, to separate the pads on both leading and trailing sides. Movement of the pads away from the disc when the brakes are released is therefore substantially perpendicular to the brake disc.

As the brakes are used, the friction material 18, 22 will wear down. As a result, the brake pads become thinner. The adjuster in the operating mechanism compensates for this by gradually extending the tappets, so that in the brakes-off condition the friction material 18, 22 is always a constant distance from the brake disc 12, but support plates 16, 20 move closer together, as the friction material 18, 22 wears and the pads get thinner. Therefore, as the pads wear, the pin 24 will extend further through the aperture in the support plate 20 of the outboard pad. If the pin 24 is flush with the back of the support plate 20 when the pads are new, as shown in FIG. 1, then the extent of the pin 24 behind the support plate 20 is equivalent to the total wear across both of the pads and the disc.

This pin can be viewed, for example by looking through holes in a wheel rim. Hence the wear state of brake pads can be very quickly and easily checked, without removing the wheel and without having to crawl under the vehicle.

The pin may have marks to assist with identifying the wear state of the brake pads by looking at the pin.

Figure 2:
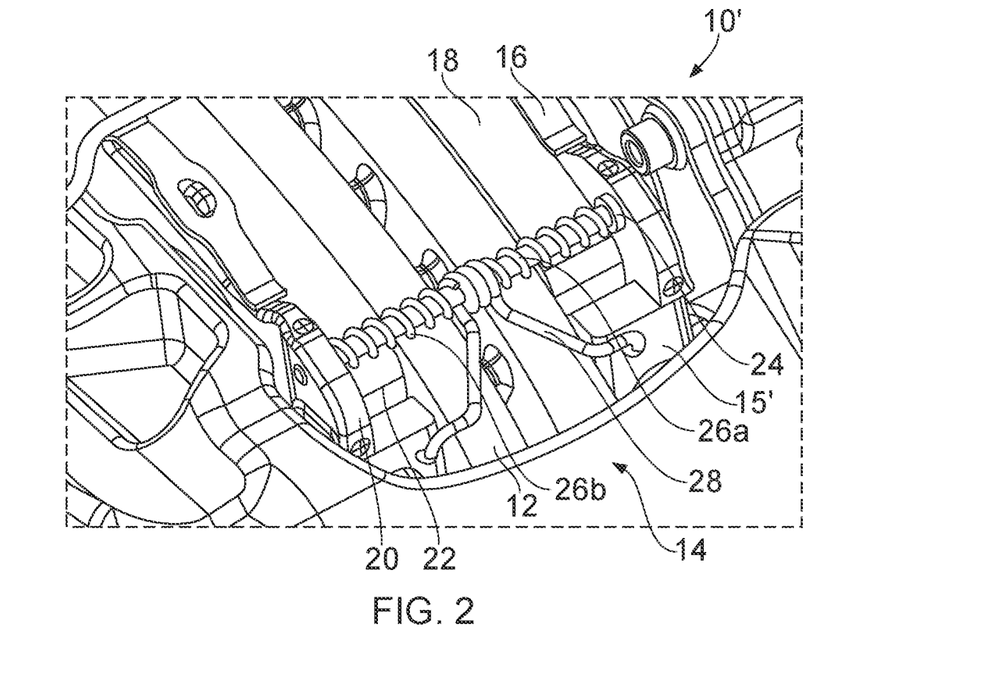
FIG. 2 is a perspective view of part of a disc brake, showing an alternative embodiment of a pad retraction mechanism and wear indicator according to the invention.

Referring now to FIG. 2, an alternative embodiment of a disc brake 10' is shown. The caliper 14, disc 12 and pads 16, 18, 20, 22 are all identical to the embodiment of FIG. 1. Also, like the FIG. 1 embodiment, a pin 24 is stays in a fixed location relative to the support plate 16 of the inboard pad, and extends and can slide through an aperture in the facing support plate 20 of the outboard pad.

However, in this embodiment a clip 28 is provided. The clip 28 is made from stiff wire, and includes a coil of two or three turns in the centre. The coil forms an apertured section of the clip 28. When assembled, the pin 24 passes through the aperture of the clip 28. The aperture of the apertured section of the clip 28 is large enough that the pin can easily slide within the aperture, with minimal resistance. However, the clip 28, immediately around the aperture, provides a surface on which a spring can act in the axial direction (i.e. the direction of the axis of the springs and pin, which is parallel with the axis of rotation of the wheel).

The clip is fixed to the brake carrier 15'. In this embodiment, the clip 28 is fixed to the brake carrier 15' in two places, one at either side of the brake disc 12. Where the clip 28 is fixed to the carrier 15', in this embodiment, an end of the stiff wire clip is a press fit into an aperture in the carrier 15'. In this way, the apertured section of the clip 28 is supported and fixed relative to the carrier 15', substantially centrally between the two brake pads.

In this embodiment, two springs 26a, 26b are provided, each spring being supported on the pin 24. A first spring 26a is supported on the pin, between the end of the pin which is fixed to the inboard support plate 16 and the apertured section of the clip 28. The spring 26a is normally in compression, and hence urges the support plate 16 of the inboard brake pad away from the clip 28. The clip 28 in turn is fixed relative to the brake carrier 15'. Similarly, a second spring 26b is supported on the pin, between the outboard support plate 20 and the clip 28. The second spring 26b urges the outboard support plate 20 away from the clip 28. In this way, the brake pads are independently forced away from a central point fixed relative to the carrier 15'. This ensures that when the brakes are released, both of the brake pads are pushed away from the brake disc 12, so that they do not contact the brake disc 12.

Although only the leading side arrangement is shown in FIG. 2, again a similar arrangement may be provided at the trailing side of the brake pads.

Referring now to FIG. 3, the pin 24, springs 26a, 26b, and clip 28 can be seen in more detail. Note that the pin 24 includes a flange 25 which prevents the pin sliding through the aperture in the support plate (16) of the inboard brake pad. Hence the pin 24 is held in a fixed location relative to support plate (16) in use. In some embodiments, the end of the pin, to the right of the flange 25 in FIG. 3, is thicker so that it forms a secure press fit into the respective aperture in support plate (16), but this is not necessary as the spring and the flange keep the pin 24 fixed relative to the support plate (16). In another alternative it is the other end of the pin, for the extent to which it needs to pass through the aperture in support plate (20) which is thinner, or in a further alternative embodiment the apertures in the support plates (16, 20) are different sizes.

There is also a mark 27, in the form of a cut into the pin 24. The mark 27 is provided at a point along the pin 24, corresponding to the maximum wear after which the brake pads should be replaced. I.e. when the mark 27 is visible because it has extended through the aperture in the support plate (20) of the outboard pad, the brake pads should be replaced.

The springs 26a, 26b are coil springs, and the interior diameter of the coil is such that they are supported by the pin 24, but there are no significant forces between the pin 24 and the springs 26a, 26b. The springs 26a, 26b act in the axial direction, between the clip 28 and the brake pads.

The clip 28 is made from stiff wire. Although the wire may deform slightly when forces are applied, the clip 28 is symmetrical and anchored in use to the carrier (15') on both sides of the brake disc 12. Therefore, the apertured portion of the clip, which comprises a coil of two or three turns, can be expected to remain in essentially the same position.

Referring now to FIG. 4, a brake pad is seen from in front, i.e. looking towards the side on which the friction material is mounted. The inboard brake pad is shown, although the outboard pad may be identical, or differ only in the sizes of the apertures in some embodiments.

The friction material 18 has a top edge 30 which follows the curvature of an outer edge of the brake disc (12). The support plate 16 supports the entirety of the friction material 18, and also extends beyond the friction material, to the sides of the friction material and above the friction material. A leading side 32 of the friction material and a trailing side 34 of the friction material are substantially parallel to each other. The leading and trailing sides 32, 34 merge into a bottom edge 36 of the friction material at curved corners 33, 35. The curved corners have a radius of curvature of at least 20 mm. The bottom edge 36 of the friction material is curved and substantially concentric with the top edge 30.

The support plate 16 extends outwardly from each of the leading side 32 and trailing side 34 of the friction material, near the top edge 30, to form a shoulder with a horizontal and downward-facing edge 38. This downward-facing edge 38 rests against, and slides on, part of the brake carrier (15, 15'), as seen in FIG. 1 and FIG. 2. Vertical, side-facing straight edges of the support plate 16 extend from just below the shoulder, following the line of the leading and trailing sides 32, 34 of the friction material. These vertical edges are in close proximity to, and slide against, parts of the brake carrier (15, 15') when the brake is assembled.

Below the bottom of the side-facing edges, no part of the brake pad is in contact with the brake carrier in use. This reduces or eliminates tilting of the brake pad which otherwise may arise as a result of the springs (26, 26a, 26b) acting around the apertures near the top of the support plate 16, and frictional forces between the brake pad and the carrier acting at a lower point. Preferably, the horizontal edges 38 are no more than 15 mm, no more than 20 mm, no more than 25 or no more than 30 mm from the apertures through the support plate. Preferably, no part of the brake pad which is in contact with the brake carrier in use is more than 65 mm from the apertures in the support plate.

Figure 5:
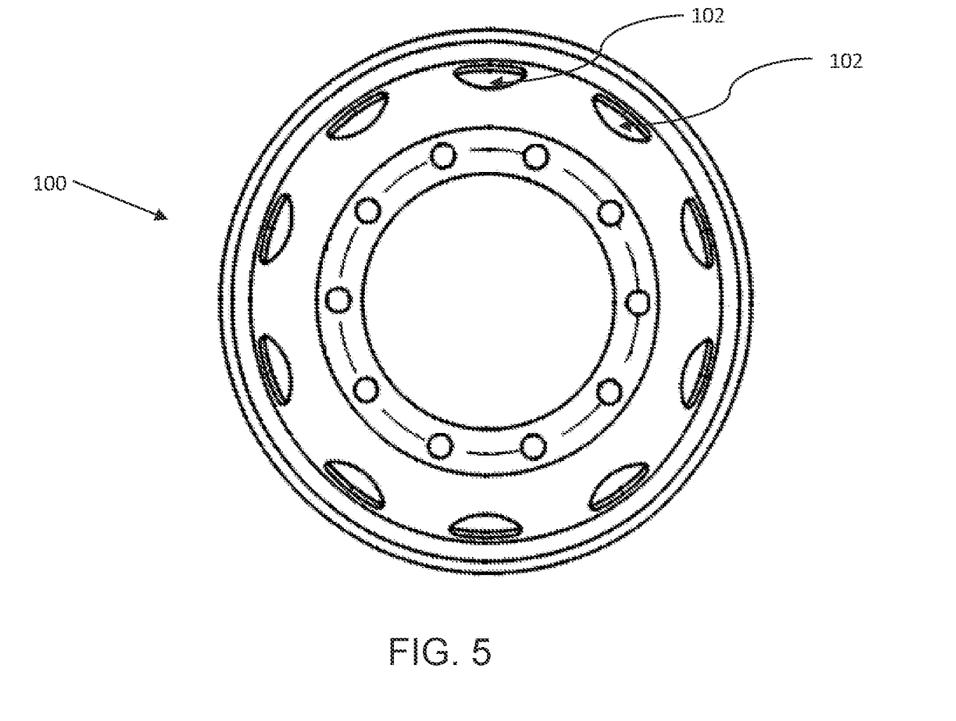
FIG. 5 is a view of a typical vehicle wheel, as seen from the side of the vehicle.

FIG. 5 shows a typical wheel 100 on a large vehicle such as a truck or a bus. The wheel rim includes apertures 102 around the edge of the rim. These apertures correspond to the radial position at which the top of the brake pads are located. It is therefore possible to see the pin (24), and the extent to which it is protruding through the aperture in the support plate (20) of the outboard brake pad. This provides a good indication of brake pad wear state. Because there are two pins, one at each side of the outboard pad, and the apertures 102 in the wheel rim are quite wide, it is highly likely that at least one of the pins (24) will be visible through at least one of the apertures 102, in any position of the wheel 100.

Figure 6:
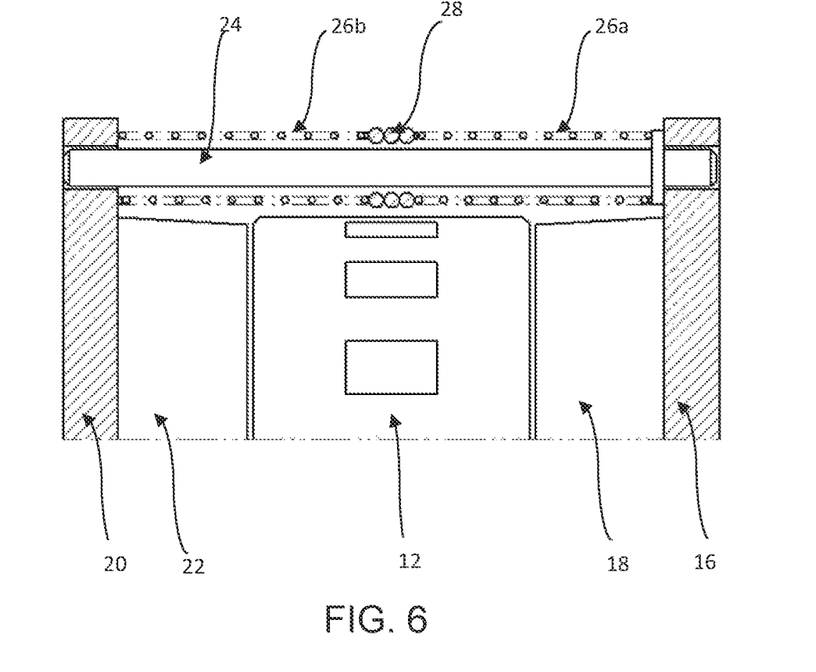
FIG. 6 is a schematic plan view of part of the second embodiment of the pad retraction mechanism and wear indicator, when the brake pads are newly installed.
Figure 7:
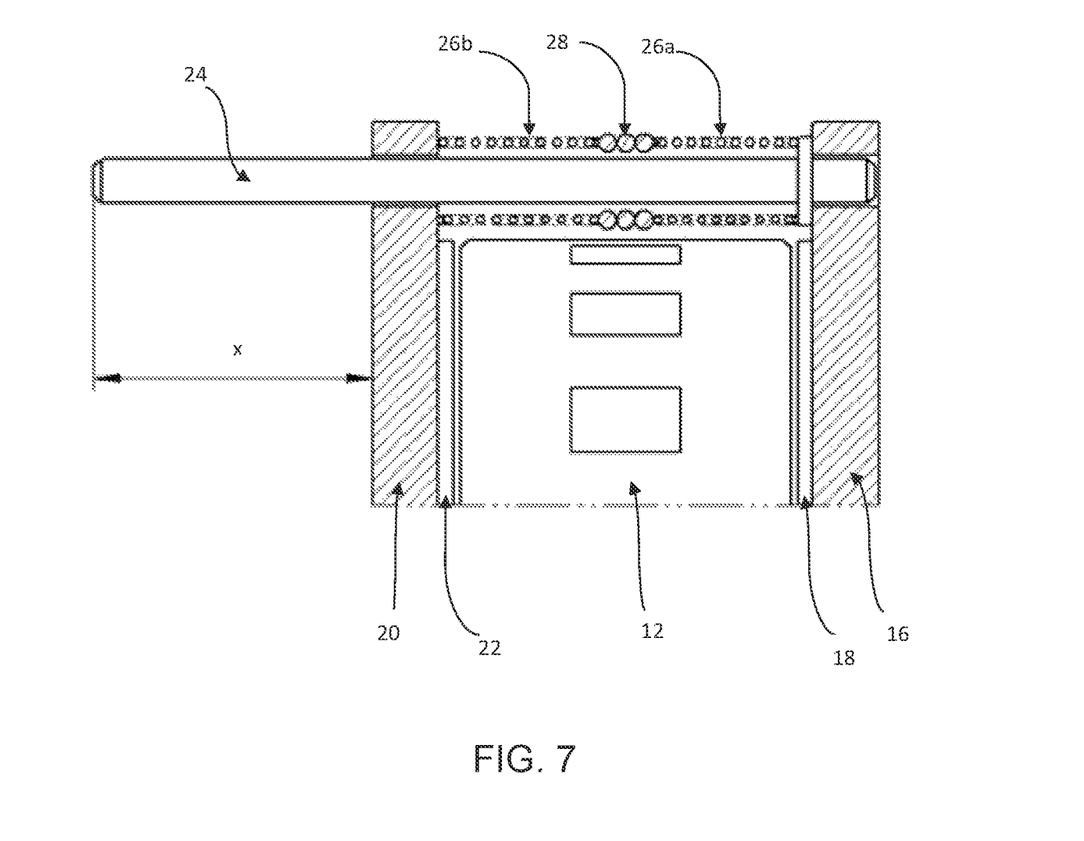
FIG. 7 is a schematic plan view of part of the second embodiment of the pad retraction mechanism and wear indicator, when the brake pads are fully worn.

FIG. 6 and FIG. 7 show more clearly how the extent of the pins 24 indicate wear state. In FIG. 6, the pads are new and unworn. In the brakes-off position there is a very small gap between the brake disc 12 and the friction material 18, 22 of the brake pads. The springs 26a, 26b push the pads away from each other, and away from the clip 28 which is fixed relative to the vehicle. The caliper and tappets of the brake are not shown in the drawing, but on the inboard (right-hand side in the drawing) the tappet(s) will constrain the inboard brake pad, and on the outboard (left-hand side in the drawing) the caliper will constrain the outboard brake pad. Hence, although the springs 26a, 26b are slightly in compression and are exerting a small outward force, the pads cannot be moved further apart than as shown in FIG. 6.

In FIG. 7, the pads are worn. The friction material 18, 22 is much thinner. Note that the disc will also wear, although to a lesser extent than the pads (disc wear is not shown in FIG. 7 but in practice a worn disc would be a bit thinner; typically disc wear can be up to about 4 mm per side and pad wear can be up to about 20 mm per pad). As the pads have worn, the adjuster has extended the tappets so that the running clearance of the pads, i.e. the distance of the pads from the disc, is maintained. The same small gap between the brake disc 12 and the friction material 18, 22 is therefore shown in FIG. 7. However, the support plates 16, 20 of the brake pads are now significantly closer together. The springs 26a, 26b continue to push the pads apart, but the pads are still constrained by the tappets and the caliper, the tappets having been extended by the adjuster to take up the pad wear. Therefore, the pads are shown in FIG. 7 as far apart as they will go, in this state of wear. Because the pads are now much closer together than when they were new, the pin 24 extends significantly out of the back of the outboard brake pad. The distance of the extension, indicated as x in the drawing, corresponds to the total wear on both pads (and on the disc).

The brake described ensures that running clearance is always maintained, and the pads do not drag against the disc or wear in use when not applied. This increases fuel efficiency, reduces emissions, ensures that the brakes are fully effective when required, and increases the service life of the disc and pads.

The embodiments described above are provided by way of example only, and various changes and modifications will be apparent to persons skilled in the art without departing from the scope of the present invention as defined by the appended claims.

The invention claimed is:

1. A sliding caliper air disc brake comprising:
a brake disc;
a brake carrier;
a brake caliper slidably mounted on the brake carrier;
a first brake pad assembly slidably mounted to the brake carrier on an inboard side of the brake disc, and a second brake pad assembly slidably mounted to the brake carrier on an outboard side of the brake disc, each brake pad assembly including a support plate and a friction material fixed to the support plate;
at least one pin marked with at least one marking for indicating a wear state of the brake pads, the pin being located in a fixed position relative to the first brake pad assembly, and extending towards and being slidable through an aperture in the second brake pad assembly, and a spring supported on the pin for urging the first brake pad assembly away from the second brake pad assembly.

2. The sliding caliper air disc brake as claimed in claim 1, in which the spring is a coil spring, the coil of the spring surrounding the pin.

3. The sliding caliper air disc brake as claimed in claim 1, in which two pins are provided, one pin being located in a fixed position relative to a brake pad assembly at a leading side of the brake pad assembly and one pin being located in a fixed position relative to a brake pad assembly at a trailing side of the brake pad assembly.

4. The sliding caliper air disc brake as claimed in claim 1, in which at least one of the two pins is located in a fixed position relative to the first brake pad assembly, and slidably extends through an aperture in the second brake pad assembly.

5. The sliding caliper air disc brake as claimed in claim 4, in which two pins are provided, one pin being located in a fixed position relative to the first brake pad assembly at a leading side of the first brake pad assembly and one pin being located in a fixed position relative to the first brake pad assembly at a trailing side of the first brake pad assembly, and each of the two pins slidably extends through an aperture in the second brake pad assembly.

6. The sliding caliper air disc brake as claimed in claim 1, in which the marking is in a form of a groove in the pin.

7. The sliding caliper air disc brake as claimed in claim 6, in which each brake pad assembly contacts the brake carrier at a horizontal abutment surface of the brake pad assembly.

8. The sliding caliper air disc brake as claimed in claim 7, in which the horizontal abutment surface is provided as a shoulder of the brake pad assembly.

9. The sliding caliper air disc brake as claimed in claim 7, in which the pin is fixed to the brake assembly, or passes through the brake pad assembly, at a point no more than 25 mm vertically from the horizontal abutment surface.

10. The sliding caliper air disc brake as claimed in claim 7, in which the brake pad assembly contacts the brake carrier at a vertical abutment surface of the brake pad assembly.

11. The sliding caliper air disc brake as claimed in claim 10, in which the vertical abutment surface extends below and substantially at right angles to the horizontal abutment surface.

12. The sliding caliper air disc brake as claimed in claim 10, in which the pin is fixed to the brake pad assembly, or passes through the brake pad assembly, at a point no more than 65 mm from a bottom of the vertical abutment surface.

13. The sliding caliper air disc brake as claimed in claim 7, in which a side edge of each brake pad assembly transitions to a bottom edge of the brake pad assembly in a curve.

14. A sliding caliper air disc brake comprising:
a brake disc;
a brake carrier;
a brake caliper slidably mounted on the brake carrier;
a first brake pad assembly slidably mounted to the brake carrier on an inboard side of the brake disc, and a second brake pad assembly slidably mounted to the brake carrier on an outboard side of the brake disc, each brake pad assembly including a support plate and a friction material fixed to the support plate;
at least one pin, the pin being located in a fixed position relative to the first brake pad assembly, and extending towards and being slidable through an aperture in the second brake pad assembly, and a spring supported on the pin for urging the first brake pad assembly away from the second brake pad assembly, in which a location clip is provided, the location clip including an apertured portion which surrounds the pin, at a point along the pin which is between the two brake pad assemblies, and in which the location clip is fixed to the brake carrier.

15. The sliding caliper air disc brake as claimed in claim 14, in which two springs are provided, each spring being supported on the pin, one spring acting between the location clip and the first brake pad assembly and the other spring acting between the location clip and the second brake pad assembly.

16. The sliding caliper air disc brake as claimed in claim 14, in which the location clip is formed from stiff wire and the apertured portion is provided as a coil.

17. The sliding caliper air disc brake as claimed in claim 14, in which the location clip is fixed to the brake carrier in two positions, one on either side of the brake disc.

18. The sliding caliper air disc brake as claimed in claim 14, in which the location clip is fixed to the carrier by a press fit into at least one aperture in the carrier.

19. The sliding caliper air disc brake as claimed in claim 14, in which the location clip is a pressed sheet steel part.

* * * * *